Patented Mar. 29, 1932

1,851,394

UNITED STATES PATENT OFFICE

HEINRICH LIER AND ALFRED RHEINER, OF BASEL, SWITZERLAND, ASSIGNORS TO THE FIRM OF CHEMICAL WORKS FORMERLY SANDOZ, OF BASEL, SWITZERLAND

PREPARATION OF WETTING AGENTS

No Drawing. Application filed August 14, 1930, Serial No. 475,373, and in Germany June 16, 1930.

The wetting power of an alkali lye in the treatment of natural and artificial cellulosic fibres can be increased by adding to them small quantities of suitable mixtures of phenols with such derivatives of polyhydric aliphatic alcohols that contain at least one free hydroxyl group and at least one —R—O—R$_1$- group wherein R and R$_1$ represent alkyl, aralkyl, aryl, alkylidene, aralkylidene, alkylene, aralkylene and arylene groups.

We have now found that the wetting properties of alkaline solutions can further be improved by an addition thereto of mixtures which are in so far different from the preparations cited above as the said derivatives of polyhydric alcohols are partly replaced by saturated or unsaturated mono- or polyhydric alcohols of the aliphatic, araliphatic, hydroaromatic or other cyclic series containing at least one carbon atom more than hydroxylic groups or by ketone alcohols.

Thus, the present invention essentially consists in the use of mixtures of phenols with mono- or polyhydric alcohols and derivatives of polyhydric alcohols of the above defined nature. Suitable monohydric alcohols are alcohols of the aliphatic, araliphatic or hydroaromatic series, f. i. propyl-, butyl-, amylalcohol, allyl-, benzylalcohol, hydrogenated phenols and naphthols, and as polyhydric alcohols the homologues of glycol and glycerine, the hydrogenated polyphenols, and as ketone alcohol the diaceton alcohol may be used. Also mixtures of these different substances may be employed.

Example 1

To 100 parts of a caustic soda solution of 30° Bé. is added one per cent of a mixture consisting of 95 per cent of a technical xylenol mixture, of 2 per cent of a technical methylcyclohexanol mixture and of 3 per cent of diethylene-glycol-monobutylether. The thus obtained lye wets immediately raw sized cotton fabrics.

Example 2

1.2 parts of a mixture consisting of 95 per cent of technical xylenols, of 3 per cent of a methylcyclohexanol mixture and of 2 per cent of glycerine-α-monoxylenylether are dissolved in 100 parts of a caustic soda solution of 30° Bé. The clear solution thus obtained immediately wets out dry, raw sized cotton fabrics, which are uniformly impregnated and shrink very rapidly.

Example 3

To 100 parts of a mercerizing lye of 30° Bé. are added 0.8 per cent of a mixture consisting of 85 per cent of a technical cresol mixture, of 7.5 per cent of glycerine-α-monoxylenylether and of 7.5 per cent of tetramethylethylene-glycol (pinacone). The lye thus obtained wets immediately raw sized cotton material.

Example 4

To 100 parts of a caustic soda solution of 32° Bé. are added at 15° C. under good stirring 0.29 parts of methylcyclohexanol, 0.435 parts of diethyleneglycolmonobutylether and 1.33 parts of a technical xylenol mixture. The thus obtained clear solution possesses an excellent wetting action for raw sized cotton fabrics.

What we claim is:
1. A process for the preparation of wetting agents for use in mercerizing lyes, consisting in mixing phenols with alcohols and such derivatives of polyhydric alcohols that contain at least one free hydroxyl group and at least one —R—O—R$_1$-group, wherein R and R$_1$ represent alkyl, aralkyl, aryl, alkylidene, aralkylidene, alkylene, aralkylene and arylene groups.

2. A wetting agent for use in mercerizing lyes comprising phenols, alcohols and such derivatives of polyhydric alcohols that contain at least one free hydroxyl group and at least one R—O—R$_1$-group, wherein R and R$_1$ represent alkyl, aralkyl, aryl, alkylidene, aralkylidene, alkylene, aralkylene and arylene groups.

3. A process for alkalizing cellulosic fibres, consisting in submitting them to the action of mercerizing lyes containing phenols, alcohols and such derivatives of polyhydric alcohols that contain at least one free hydroxyl group and at least one R—O—R$_1$-group, wherein R and $R_1$ represent alkyl, aralkyl, aryl, alkylidene, aralkylidene, alkylene, aralkylene and arylene groups.

4. Mercerizing lyes of high wetting-out action, containing phenols, alcohols and such derivatives of polyhydric alcohols that contain at least one free hydroxyl group and at least one R—O—$R_1$-group, wherein R and $R_1$ represent alkyl, aralkyl, aryl, alkylidene, aralkylidene, alkylene, aralkylene and arylene groups.

In witness whereof we have hereunto signed our names this 2nd day of August, 1930.

HEINRICH LIER.
ALFRED RHEINER.